United States Patent
Hannah

(10) Patent No.: US 6,875,345 B2
(45) Date of Patent: Apr. 5, 2005

(54) METHOD AND APPARATUS FOR INSTALLING AND REMOVING DISPOSABLE NETTING SYSTEMS IN FLOATABLES CONTROL SYSTEMS

(76) Inventor: Peter J. Hannah, #3, 23260 Dyke Road, Richmond, British Columbia (CA), V6V 1E2

(*) Notice: Subject to any disclaimer, the term of this patent is extended or adjusted under 35 U.S.C. 154(b) by 224 days.

(21) Appl. No.: 10/107,169

(22) Filed: Mar. 28, 2002

(65) Prior Publication Data
US 2003/0183569 A1 Oct. 2, 2003

(51) Int. Cl.⁷ ............................................. B01D 35/02
(52) U.S. Cl. ..................... 210/154; 210/162; 210/237; 210/241
(58) Field of Search ............................. 210/153–162, 210/237, 241, 359; 43/7, 8

(56) References Cited

U.S. PATENT DOCUMENTS

| | | |
|---|---|---|
| 1,216,291 A | 2/1917 | Diescher |
| 2,996,189 A | 8/1961 | Salterbach |
| 3,282,430 A | * 11/1966 | Kinne .......................... 210/162 |
| 3,788,694 A | 1/1974 | Hall |
| 4,109,952 A | 8/1978 | Monzain |
| 4,807,917 A | 2/1989 | Bunting |

FOREIGN PATENT DOCUMENTS

| | | |
|---|---|---|
| GB | 2 324 289 A | 10/1998 |
| JP | 1113975 | 5/1999 |

* cited by examiner

Primary Examiner—Robert James Popovics
(74) Attorney, Agent, or Firm—Oyen Wiggs Green & Mutala

(57) ABSTRACT

In previous netting systems using disposable netting frames, the wooden frame may become jammed in the diverter frame. The present invention provides a rigid frame for installing and holding the wooden netting frame in the diverter frame and which releases the wooden frame for disposal.

14 Claims, 12 Drawing Sheets

METHOD AND APPARATUS FOR INSTALLING AND REMOVING DISPOSABLE NETTING SYSTEMS IN FLOATABLES CONTROL SYSTEMS

TECHNICAL FIELD

The invention relates to wastewater treatment and more particularly to a method and apparatus for installing and removing disposable netting frames from Combined Sewer Overflow netting systems.

BACKGROUND

Combined Sewer Overflow ("CSO") netting systems are commonly used to provide "floatables" control for in-line, end-of pipe, and floating applications as well as on storm drain outfalls, clarifiers and various industrial applications. In some cases the netting sacks are clamped onto a metal nose box which is attached to a metal lifting assembly removably held in the main diverter frame. When the netting sack is full, the entire assembly is lifted out of the diverter frame, the netting sack is unclamped from the nose box and discarded, and a new netting sack is reinstalled on the nose box and the entire assembly is then replaced in the diverter frame. This process is time consuming, so a method of using netting sacks on disposable wooden lifting frames has been developed. In this case, the mouth of the netting sack is fixed to a rectangular disposable wooden frame which slides into guide rails in the diverter frame. When the netting sack is full, a truck crane is used to lift the wooden frame and attached netting sack out of the guide rails by looping a strap around the bag and frame and attaching it to the lifting cable. The entire assembly is then removed and discarded. The problem with this system however is that the wooden frame often expands or warps in the guide rails and jams or breaks when attempts are made to remove it from the guide rails, so workers must descend into the diverter frame and use tools to remove it. There is therefore a need for a quick and convenient means for removing and replacing disposable netting sacks.

SUMMARY OF INVENTION

The present invention provides a rigid frame for installing and holding the wooden netting frame in the diverter frame and which releases the wooden frame for disposal. The invention provides an apparatus for installing and removing disposable netting frames, comprising two opposed rigid parallel frame members, the frame members being adapted to removably receive between them a netting frame, each frame member being sized to be received in the receiving frame and having means for removably attaching lifting means. According to one aspect, the invention provides an apparatus for installing and removing disposable netting frames, comprising two opposed right-angled frame members, the frame members being adapted to receive a netting frame, each having a vertical frame member and a horizontal frame member, the horizontal frame members each having a first end adjacent to and opposed to the first end of the other horizontal frame member, and a second end, the opposed ends of the horizontal frame members being pivotally connected and having first means for selectively attaching lifting means, each horizontal frame member having second means for pivotally attaching lifting means spaced from the first end towards the second end of the horizontal frame member, third means for selectively attaching lifting means, wherein the third means for pivotally attaching lifting means is pivotally connected to the first means for selectively attaching lifting means, and means for selectively and releasably connecting the third means for selectively attaching lifting means to the first means for selectively attaching lifting means.

The invention further provides a method of installing and removing disposable netting frames comprising: a) providing frame members which comprise two opposed rigid parallel frame members, the frame members being adapted to removably receive between them a netting frame, each frame member being sized to be received in the receiving frame and having means for removably attaching lifting means; b) placing a netting frame in the frame members; c) placing the frame members and netting frame in a receiving frame; d) removing the frame members and netting frame from the receiving frame; and e) releasing the netting frame from the frame members.

DESCRIPTION OF DRAWINGS

In drawings which disclose a preferred embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
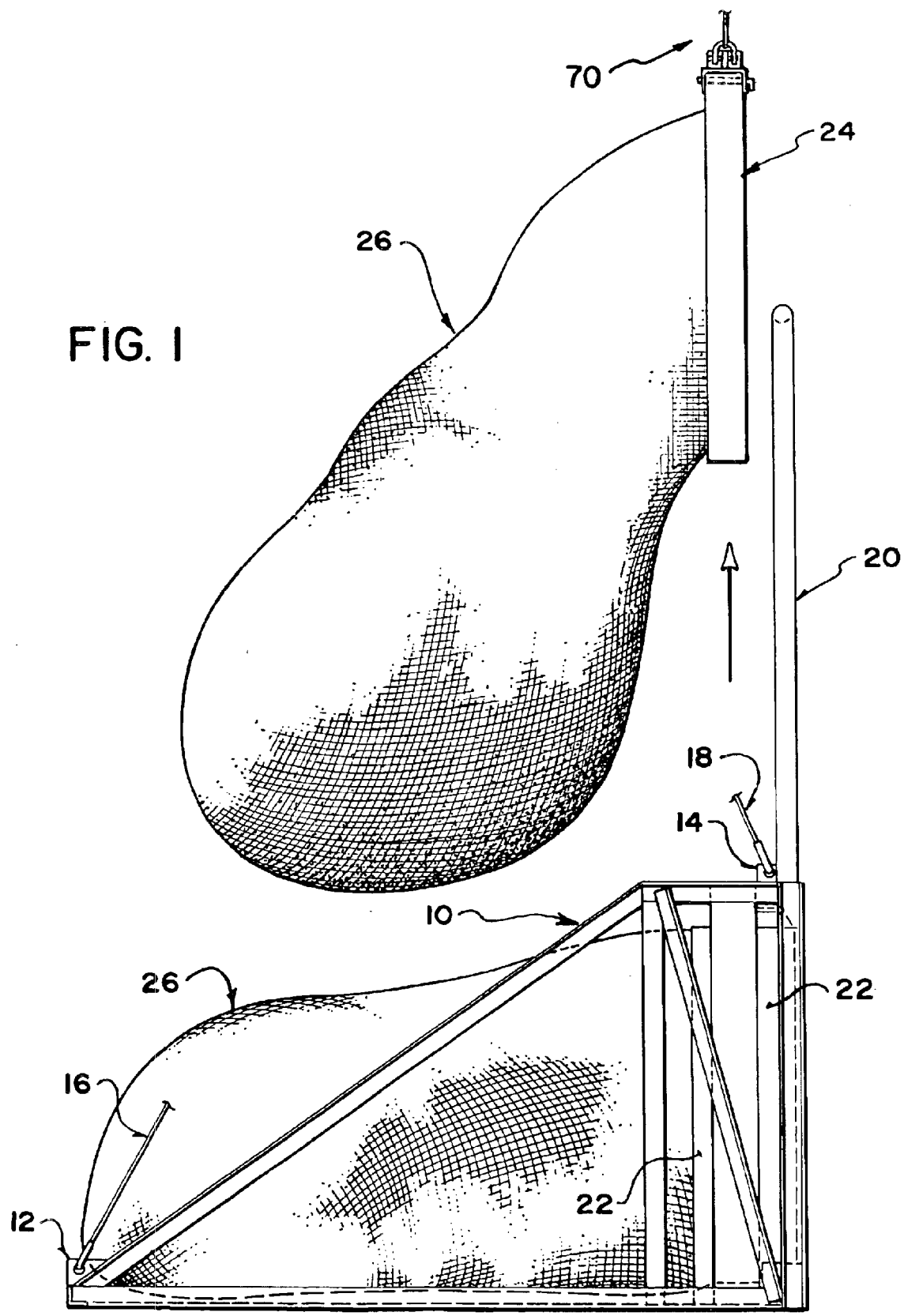
FIG. 1 is an elevation view of a netting sack and frame in place and being removed from a lifting basket.

With reference to FIG. 1, a lifting basket 10 is shown which is adapted for being removably held in place in a CSO floatables control system diverter frame. It has rear lifting lug 12, and front lifting lug 14 to which cables 16, 18 can be attached. It has a handle slide gate 20 and guide rails 22 for guiding and holding the netting frame 28 (FIG. 2) with attached netting sack 26 and frame lifting device 24. The frame lifting device is sized to slide readily into and out of position between guide rails 22 of lifting basket 10.

Figure 2:
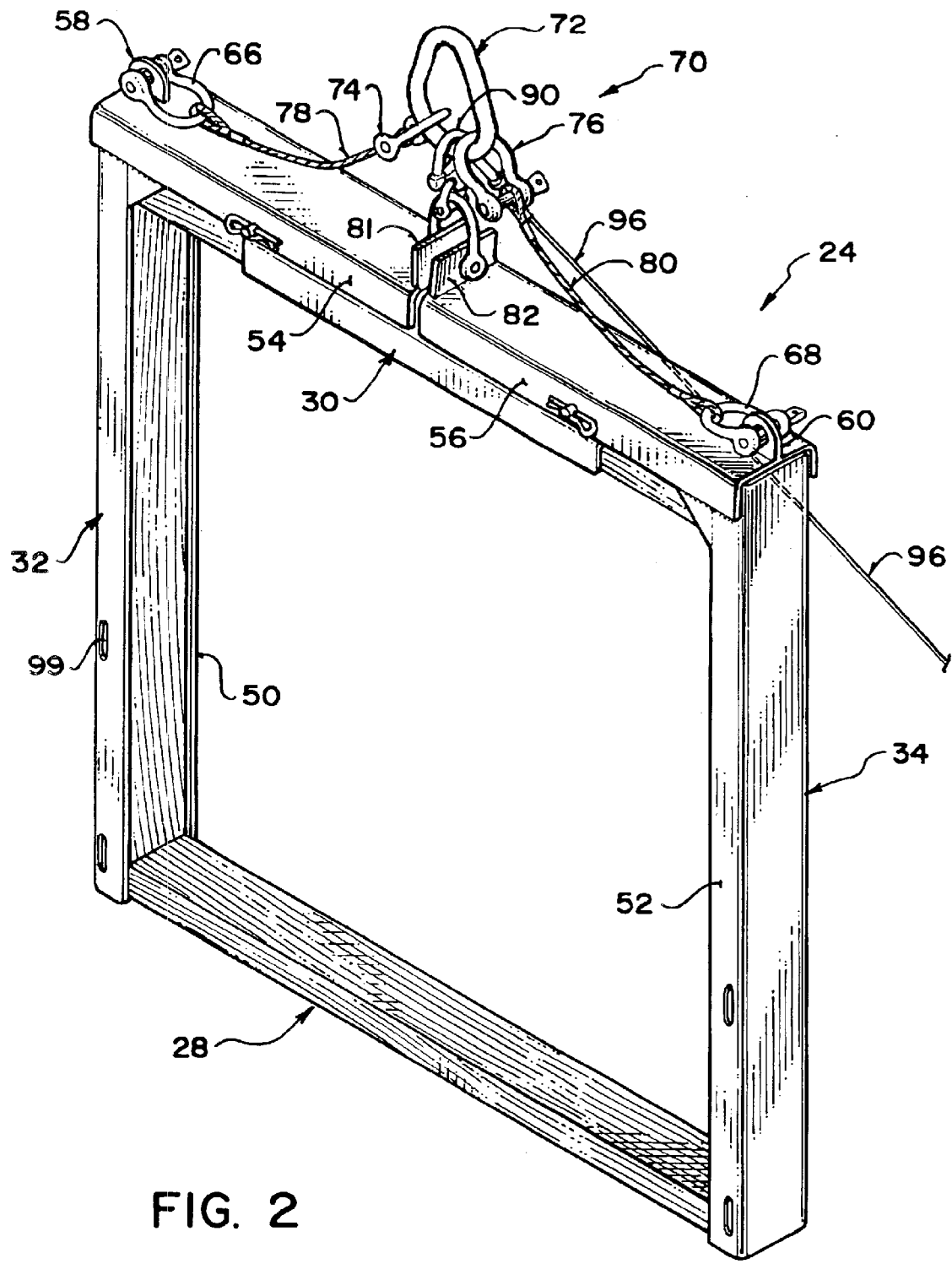
FIG. 2 is a perspective view of the invention holding a disposable wood frame in raising and lowering configuration, with netting sack not shown for purposes of illustration.
Figure 3:
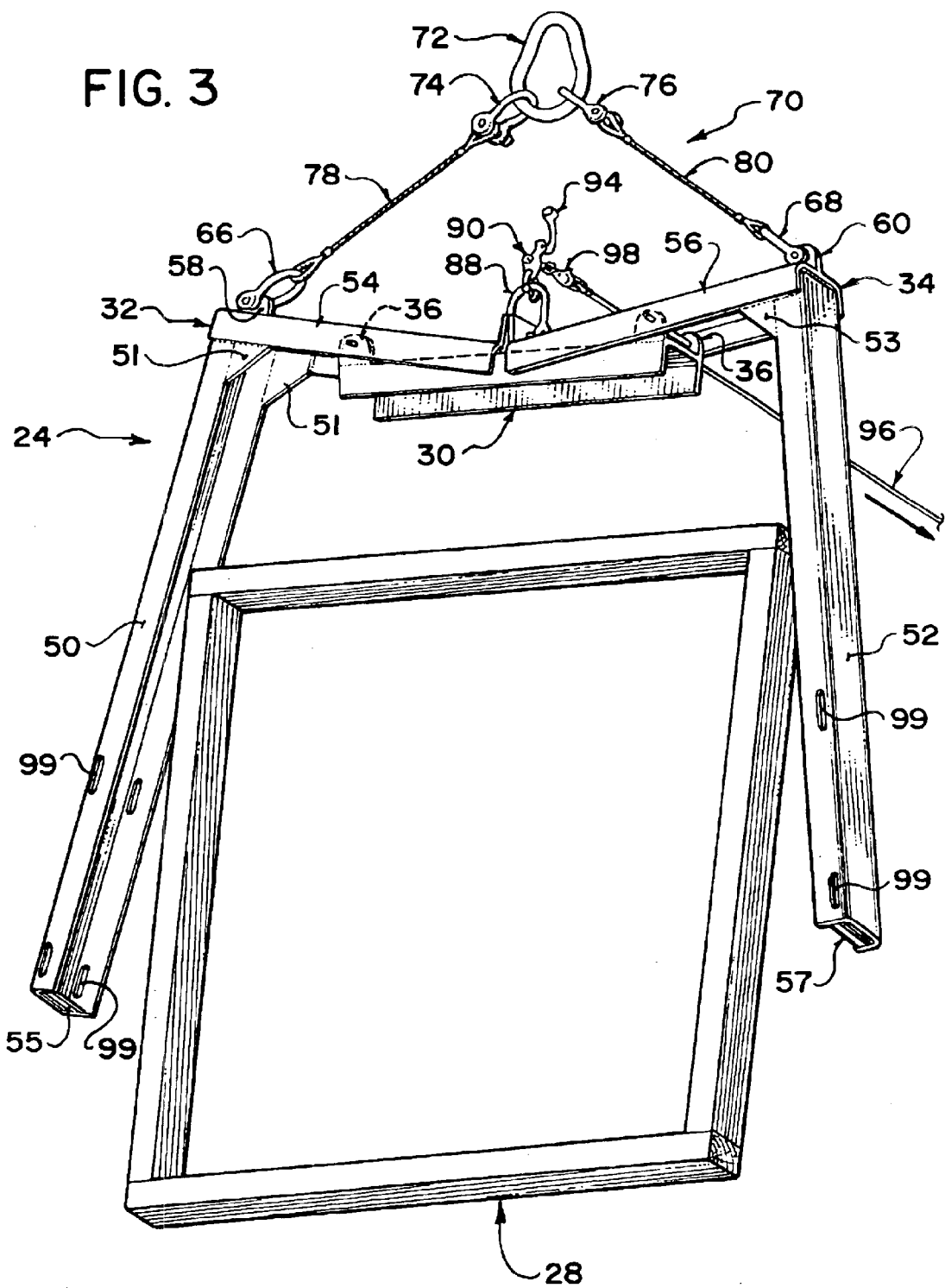
FIG. 3 is a perspective view of the invention and a disposable wood frame in release configuration, with netting sack not shown for purposes of illustration.
Figure 4:
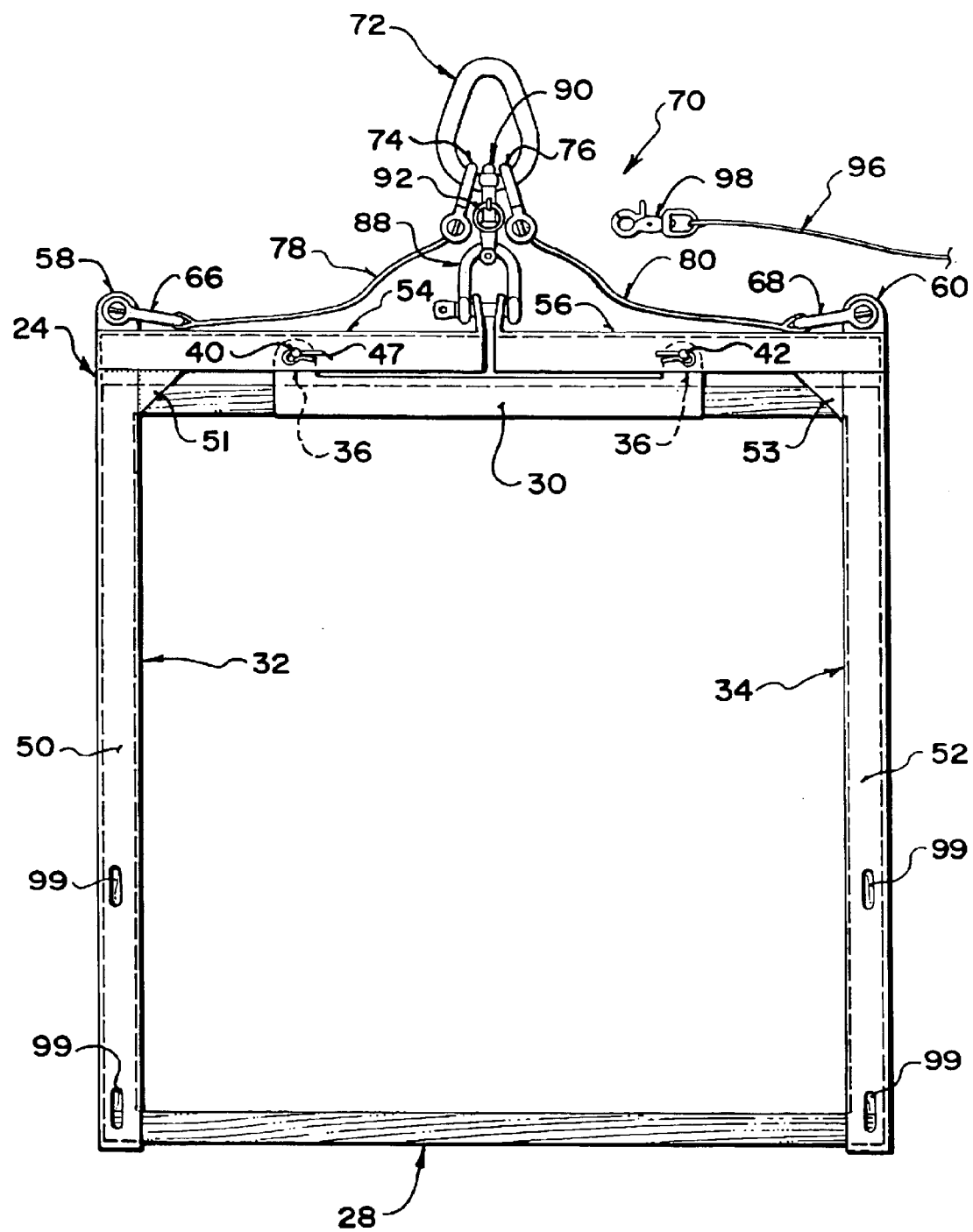
FIG. 4 is a front elevation view of the invention holding a disposable wood frame in raising and lowering configuration, with netting sack not shown for purposes of illustration.

FIGS. 2 and 4 illustrate the disposable wooden netting frame 28, with netting sack not shown, and attached frame lifting device 24 according to the invention. The frame lifting device 24 comprises a horizontal channel frame member 30 and two right-angle channel frame members 32, 34. Preferably channel frame members 30, 32, 34 are made of stainless steel, but galvanized steel or other rust-resistant rigid materials such as rust-resistant metal, plastic, fiberglass or other synthetics are also suitable. They are sized to receive the netting frame 28, which is constructed of "2×4"'s, with a spacing of about ¼" on either side of the 2×4 in the wider dimension, so the channel formed by the frame members have inner dimensions of about 4 inches by 1.5 inches. The lower end of the vertical members 50, 52 has a stop plate 55, 57 which extends across the 4 inch dimension of the channel but is only about 1 inch wide, in order to ensure that the net frame remains within the channel when being lifted. Horizontal channel frame member 30 has four projections 36 each provided with apertures 38 to receive removable hinge pins 40, 42, which are secured in apertures 44, 46 in channel frame members 32, 34 by cotter pins 47. Channel frame members 32, 34 comprise vertical channel members 50, 52 having angled corner ends 51, 53 and horizontal channel members 54, 56 which are welded to ends 51, 53. Horizontal channel members 54, 56 are provided at either outer end thereof with projections 58, 60 each having apertures 62, 64 through which shackles 66, 68 of sling 70 are pivotally attached. Sling 70 further comprises a hoisting/release ring 72, pivoting shackles 74, 76 connected through ring 72, and cables 78, 80 secured to shackles 66, 74 and 68, 76 respectively. Horizontal channel members 54, 56 are further provided at either inner end thereof with projections 81, 82 extending at right angles to members 54, 56 and each having apertures 84, 86 through which lifting shackle 88 pivotally and removably extends. Apertures 38 are preferably positioned relative to members 54, 56 so that the lower ends members 50, 52 will pivot towards each other when lifting shackle 88 is raised, but the invention will also work if apertures 38 are positioned relative to members 54, 56 so that the lower ends members 50, 52 do not pivot when lifting shackle 88 is raised.

Figure 5:
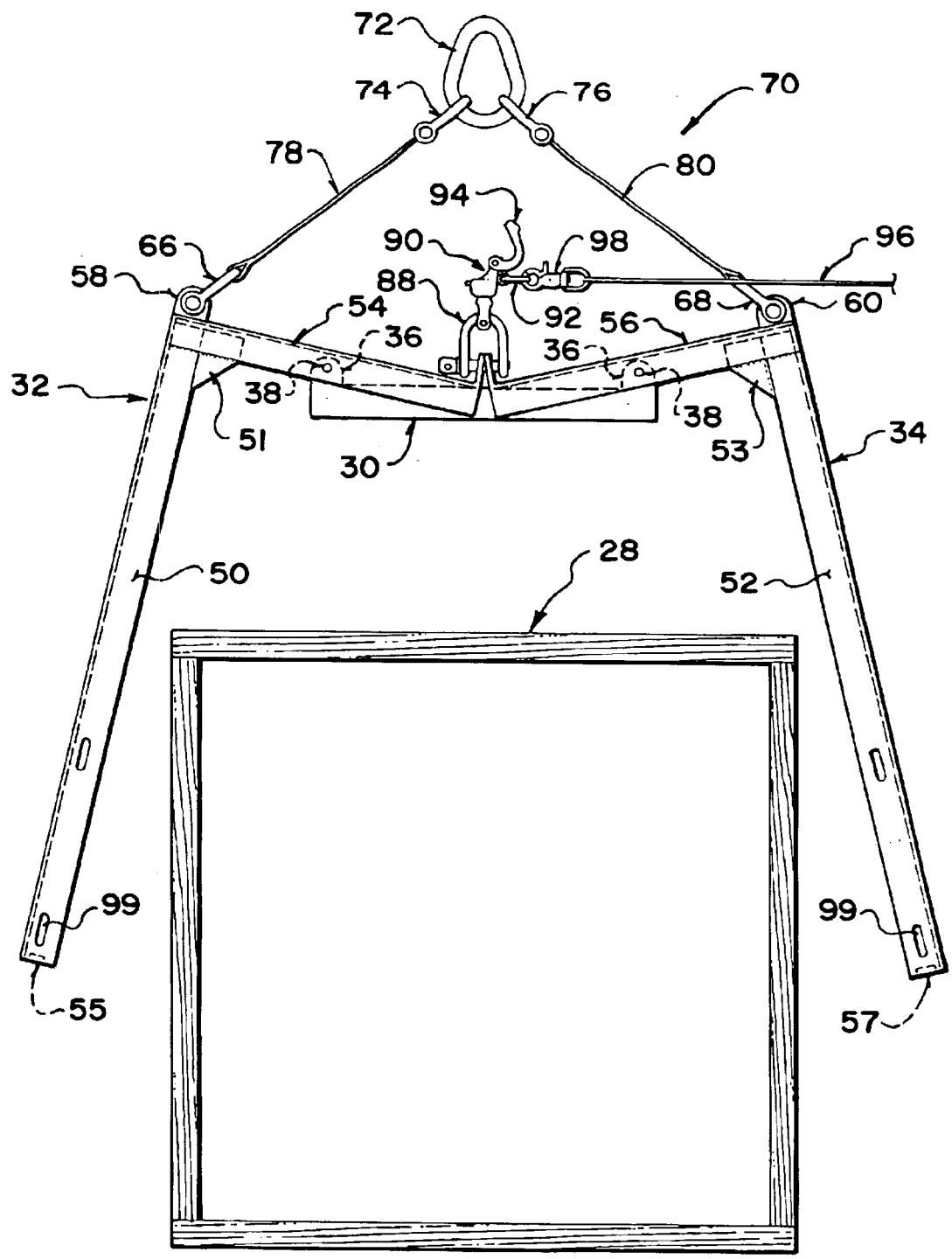
FIG. 5 is a front elevation view of the invention and a disposable wood frame in release configuration, with netting sack not shown for purposes of illustration.
Figure 6:
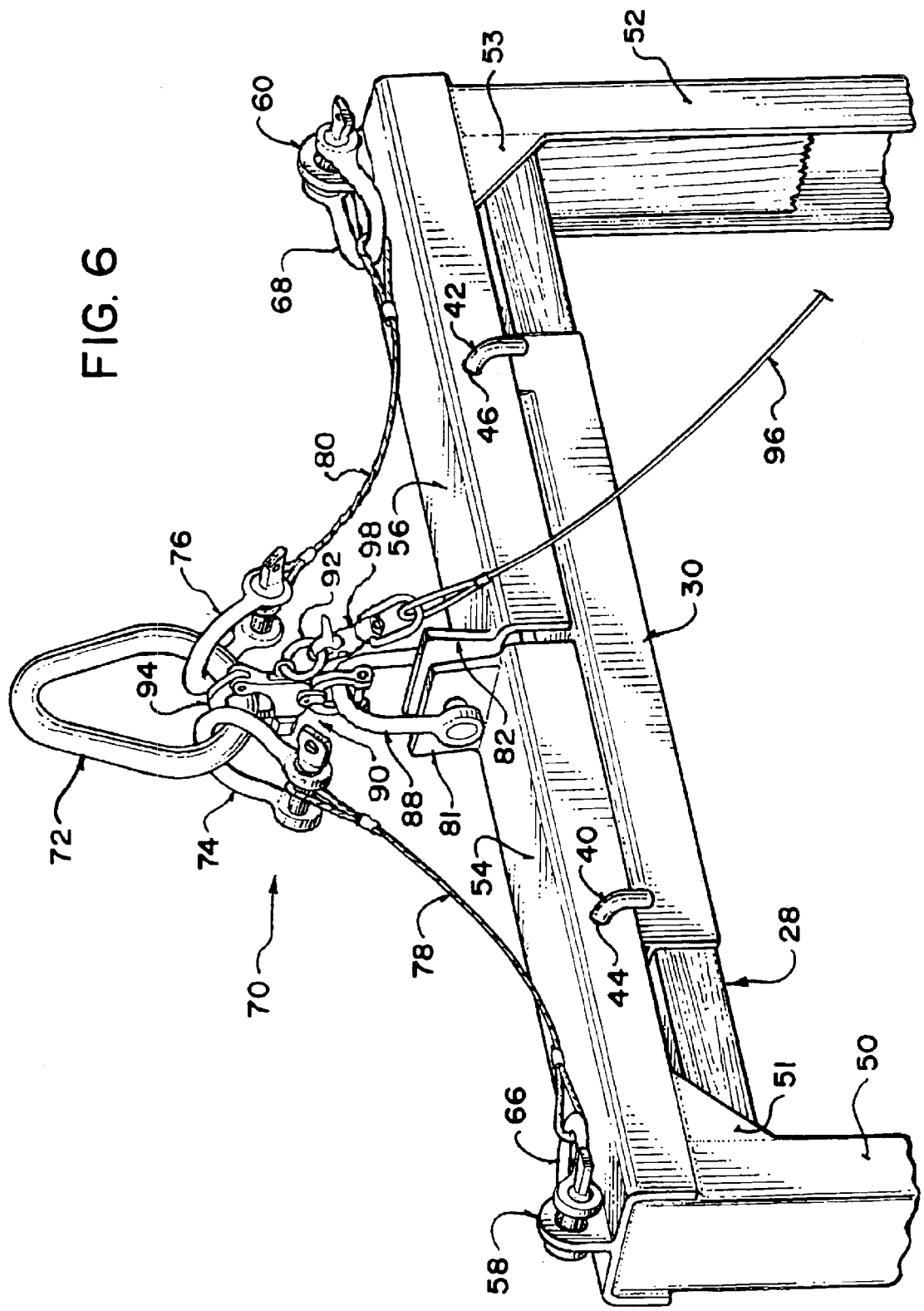
FIG. 6 is a detail perspective view of the invention holding a disposable wood frame in raising and lowering configuration, with netting sack not shown for purposes of illustration.
Figure 7:
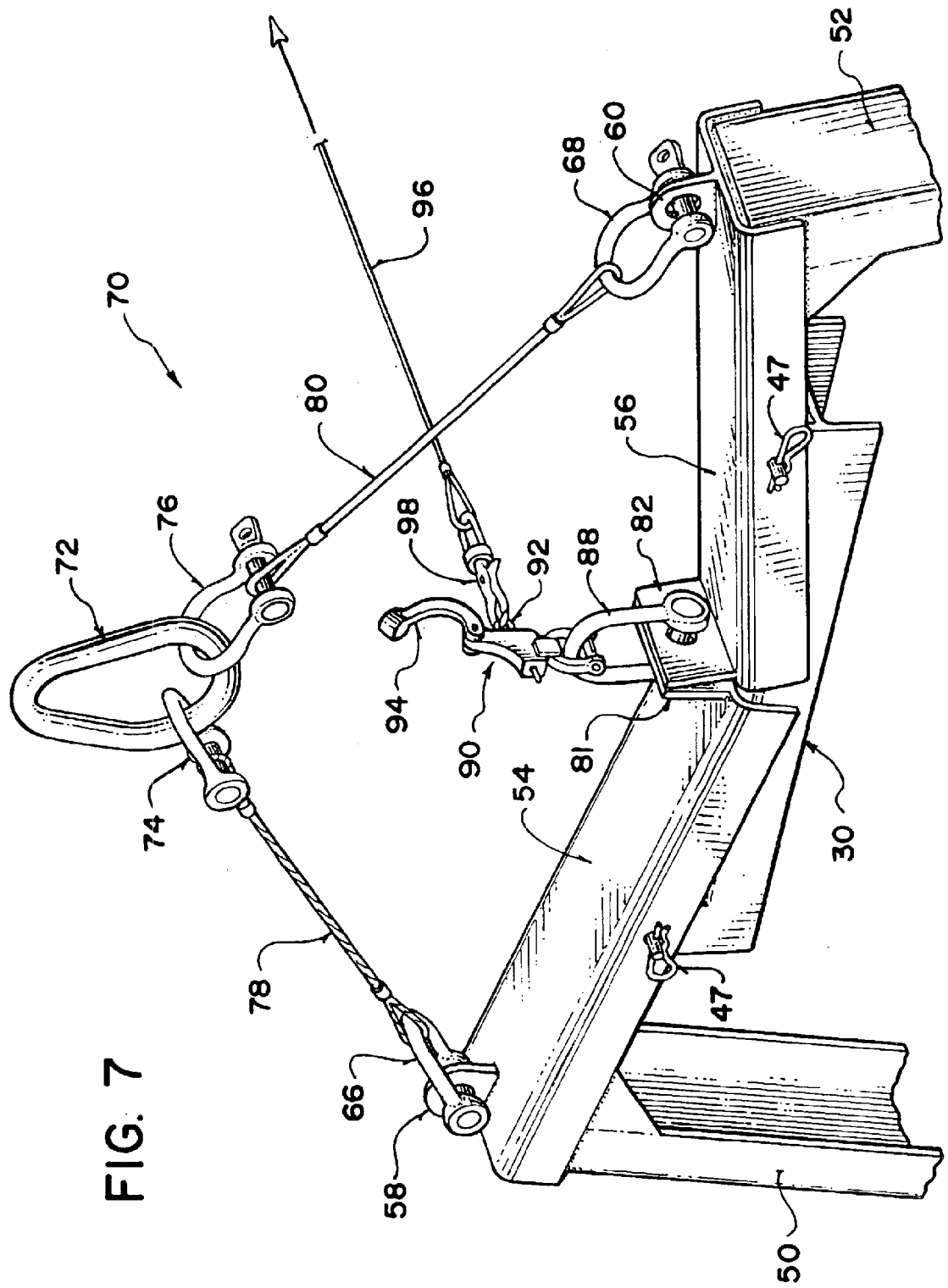
FIG. 7 is a detail perspective view of the invention holding a disposable wood frame in release configuration, with netting sack not shown for purposes of illustration.

Hoisting/release ring 72 is selectively connected to or released from lifting shackle 88 by a snap shackle 90. Snap shackle 90 has a pivoting hook 94 which moves between a snapped closed position as in FIG. 6 and an open position as in FIG. 5 when released by pulling release ring 92. A frame release cord 96 having a stainless steel trigger snap 98 is connected to release ring 92 as shown in FIG. 5 to remotely release the snap shackle 90. Vertical members 50, 52 have slots 99 into which a screwdriver or the like can be inserted to pry the wooden frame out of the channel members 50, 52 if necessary.

In operation, a new disposable wooden netting frame 28 is positioned within frame lifting device 24 as shown in FIG. 2, and is held generally in place by a friction fit. Snap shackle 90 is snapped shut to connect hoisting/release ring 72 to lifting shackle 88. A cable from a hoist is then secured to hoisting/release ring 72 to lift the new netting frame and netting sack into place between guide rails 22 as shown in FIG. 1. The lifting of ring 72, lifting shackle 88 and projections 81, 82 causes right-angle channel frame members 32, 34 to rotate about hinge pins 40, 42 causing vertical members 50, 52 to be tightly squeezed against the wooden frame 28. Once the new frame 28 and frame lifting device 24 are in place between guide rails 22, the lifting cable is removed from hoisting/release ring 72. When the netting sack needs to be replaced, a lifting cable is again attached to ring 72 and the frame lifting device 24 and attached frame 28 are lifted out of the guide rails 22 and onto the disposal truck. The disposable frame 28 is then removed by pulling frame release cord 96, which allows snap shackle 90 to release from ring 72. The weight of the device on points 58, 60 then causes members 32, 34 to rotate about pins 40, 42, thereby removing device 24 from the frame 28 and allowing the disposable frame 28 and netting sack 26 to fall away and be discarded. While the invention has been described using a snap shackle 90 for quick release, the invention will also work using a regular shackle which is manually released instead of a snap shackle.

Figure 8:
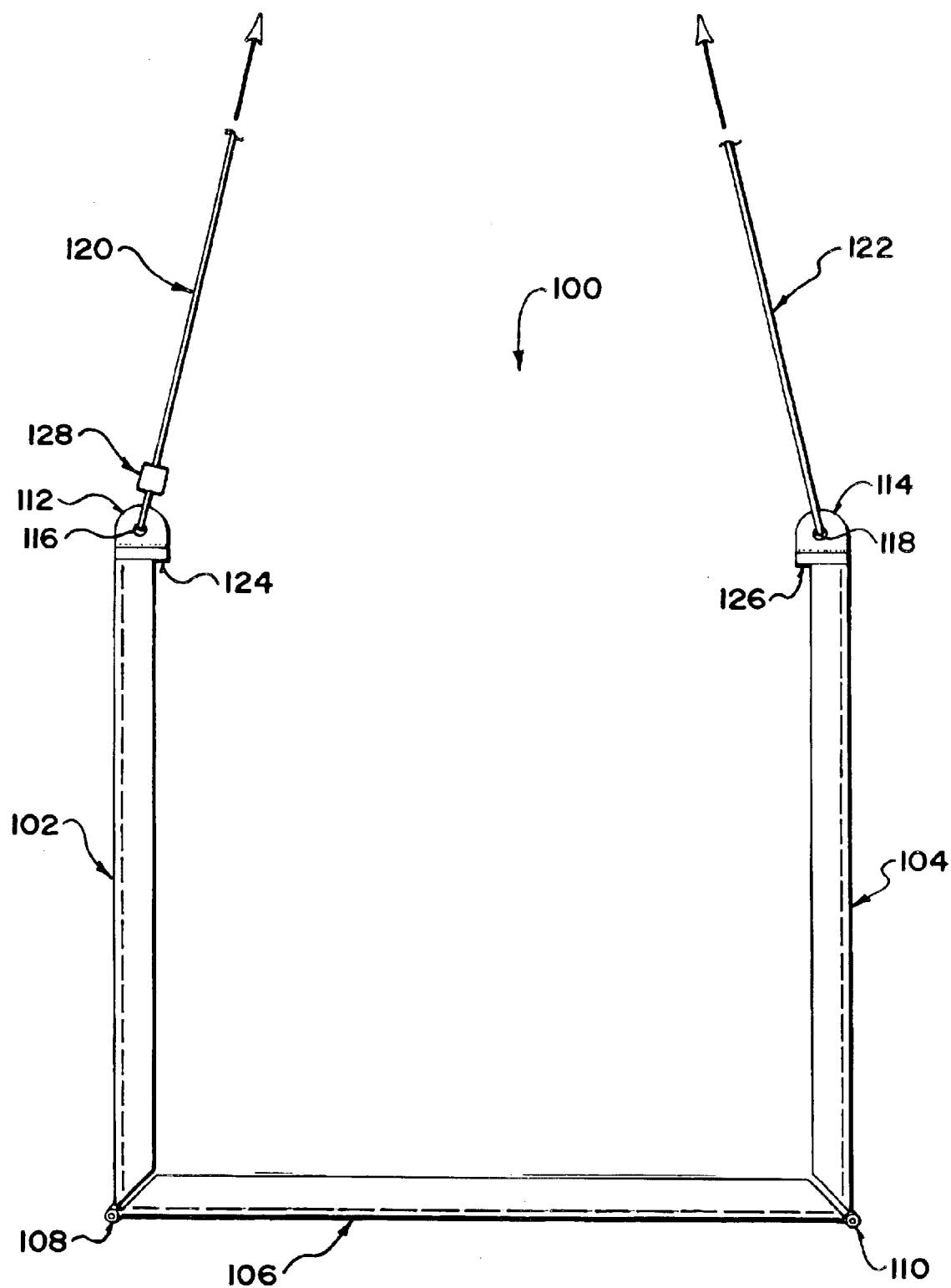
FIG. 8 is a front elevation view of a second embodiment of the invention.

In the embodiment of the invention shown in FIG. 8, the frame lifting device is designated by numeral 100. Vertical channel members 102, 104 are hingedly connected to a horizontal channel member 106 at hinges 108, 110. As in the previous embodiment, the channel members are sized to slide readily into and out of position between guide rails 22 of lifting basket 10, and to receive the netting frame 28. The interior surfaces of the channels are shown in phantom outline. Lugs 112, 114 are secured to the upper end of vertical members 102, 104 and are provided with holes 116, 118 to which lifting cables 120, 122 can be attached. A stop plate 124, 126 is provided across the vertical channels to prevent the wooden frame from floating out of the channels. Snap shackle 128 allows one of the cables 120 to be remotely detached from the frame lifting device 100. In operation, in this embodiment a new disposable wooden netting frame 28 is positioned within frame lifting device 100 and cables 120, 122 are secured to lugs 112, 114 to lift the new netting frame and netting sack into place between guide rails 22 as shown in FIG. 1. When the netting sack needs to be replaced, cables 120, 122 are again secured to lugs 112, 114 to lift the netting frame and netting sack and lifting frame 100 out of the guide rails 22 and onto the disposal truck. The disposable frame 28 is then removed by releasing shackle 128 which then causes members 102, 104, 106 to rotate about hinges 108, 110, thereby allowing the disposable frame 28 and netting sack 26 to fall away and be discarded.

Figure 9:
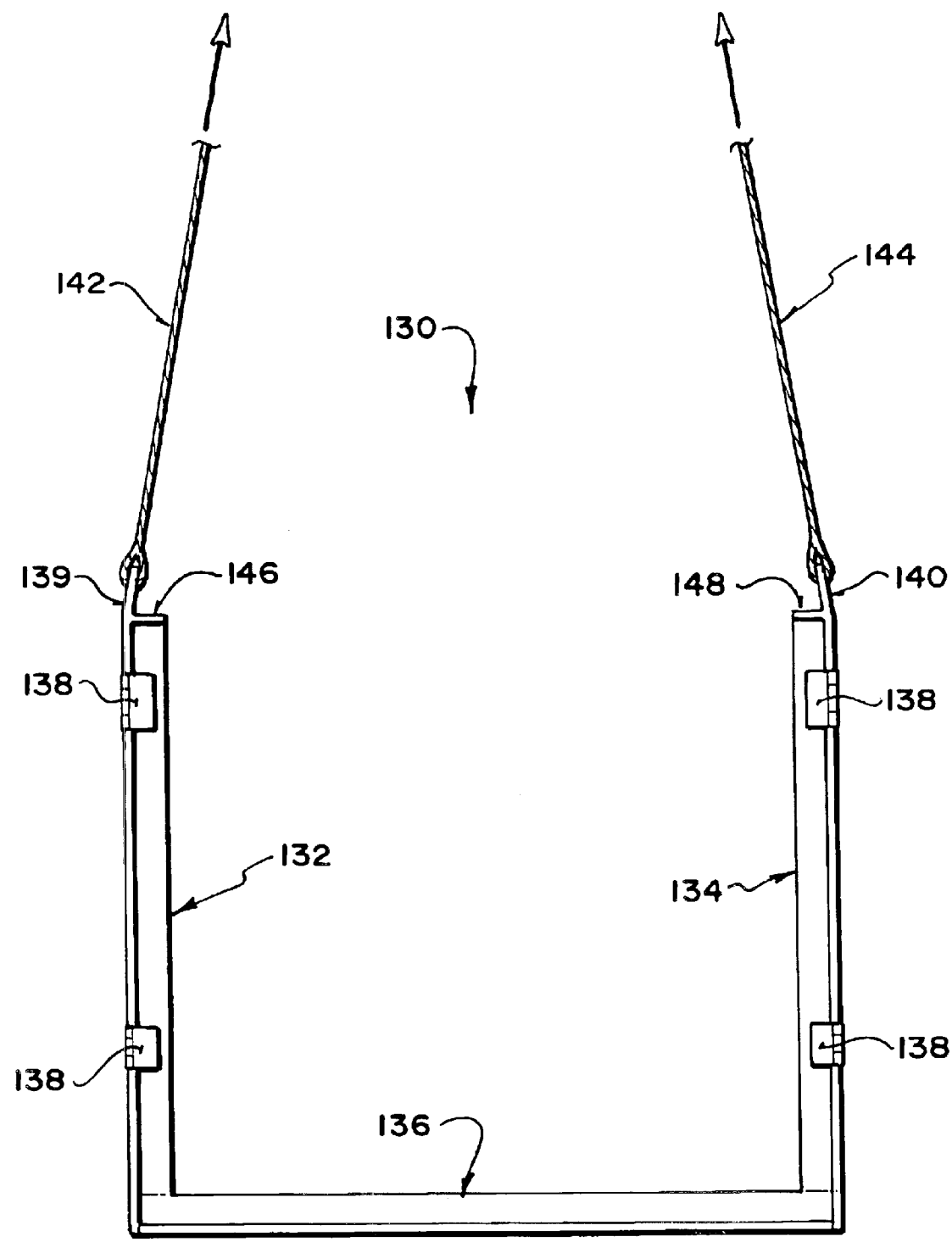
FIG. 9 is a front elevation view of a third embodiment of the invention.

In the embodiment of the invention shown in FIG. 9, the frame lifting device is designated by numeral 130. Vertical members 132, 134 and horizontal member 136 are formed of 90-degree angle iron and are rigidly welded at right angles as shown in FIG. 9. The vertical members are sized to slide readily into and out of position between guide rails 22 of lifting basket 10, and to receive the netting frame 28 from the direction extending into the page in FIG. 9. Hinged tabs 138 are provided which swing outwardly or rotate as shown in FIG. 9 to permit the netting frame to be introduced into or removed from the lifting frame. Hinged tabs 138 can be secured in the position shown in FIG. 9 by a spring or latch to hold the netting frame within the lifting frame 130. Lugs 139, 140 are secured to the upper end of vertical members 132, 134 and are provided with holes to which lifting cables 142, 144 can be removably attached. Stop plates 146, 148 are provided across the vertical members to prevent the wooden frame from floating out of the channels. In operation, in this embodiment, hinged tabs 138 are opened and a new disposable wooden netting frame 28 is positioned within frame lifting device 130. Cables 142, 144 are secured to lugs 139, 140 to lift the new netting frame and netting sack into place between guide rails 22 as shown in FIG. 1. When the netting sack needs to be replaced, cables 142, 144 lift the netting frame and netting sack and lifting frame 130 out of the guide rails 22 and onto the disposal truck. The disposable frame 28 is then removed by opening hinged tabs 138 by rotating or swinging them, thereby allowing the disposable frame 28 and netting sack 26 to be discarded.

Figure 10:
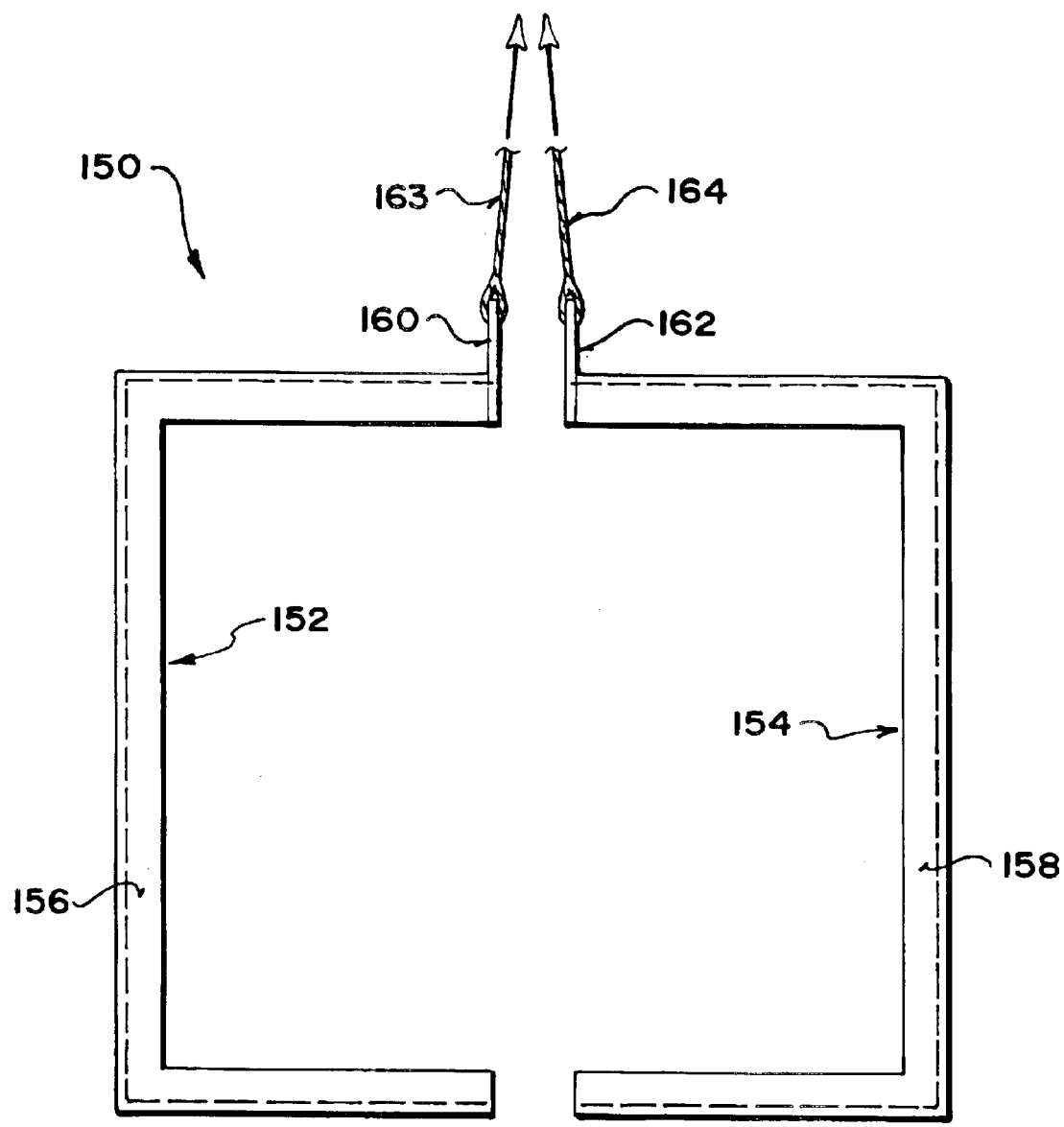
FIG. 10 is a front elevation view of a fourth embodiment of the invention.

In the embodiment of the invention shown in FIG. 10, the frame lifting device is designated by numeral 150. It comprises two opposed C-shaped channel members 152, 154 which are open on one side and sized to receive the netting frame 28 between them. The interior surfaces of the channels are shown in phantom outline The vertical portions 156, 158 of members are sized to slide readily into and out of position between guide rails 22 of lifting basket 10. Lugs 160, 162 are secured to the upper inner ends of opposed C-shaped channel members 152, 154 and are provided with holes to which lifting cables 163, 164 can be attached. In operation, in this embodiment, a new disposable wooden netting frame 28 is positioned within frame lifting device 150. Cables 163, 164 are secured to lugs 160, 162 to lift the new netting frame and netting sack into place between guide rails 22 as shown in FIG. 1. When the netting sack needs to be replaced, cables 163, 164 are used to lift the netting frame and netting sack and lifting frame 150 out of the guide rails 22 and onto the disposal truck. The disposable frame 28 is then removed by removing the tension from cables 163, 164 and spreading members 152, 154 thereby allowing the disposable frame 28 and netting sack 26 to be discarded.

Figure 11:
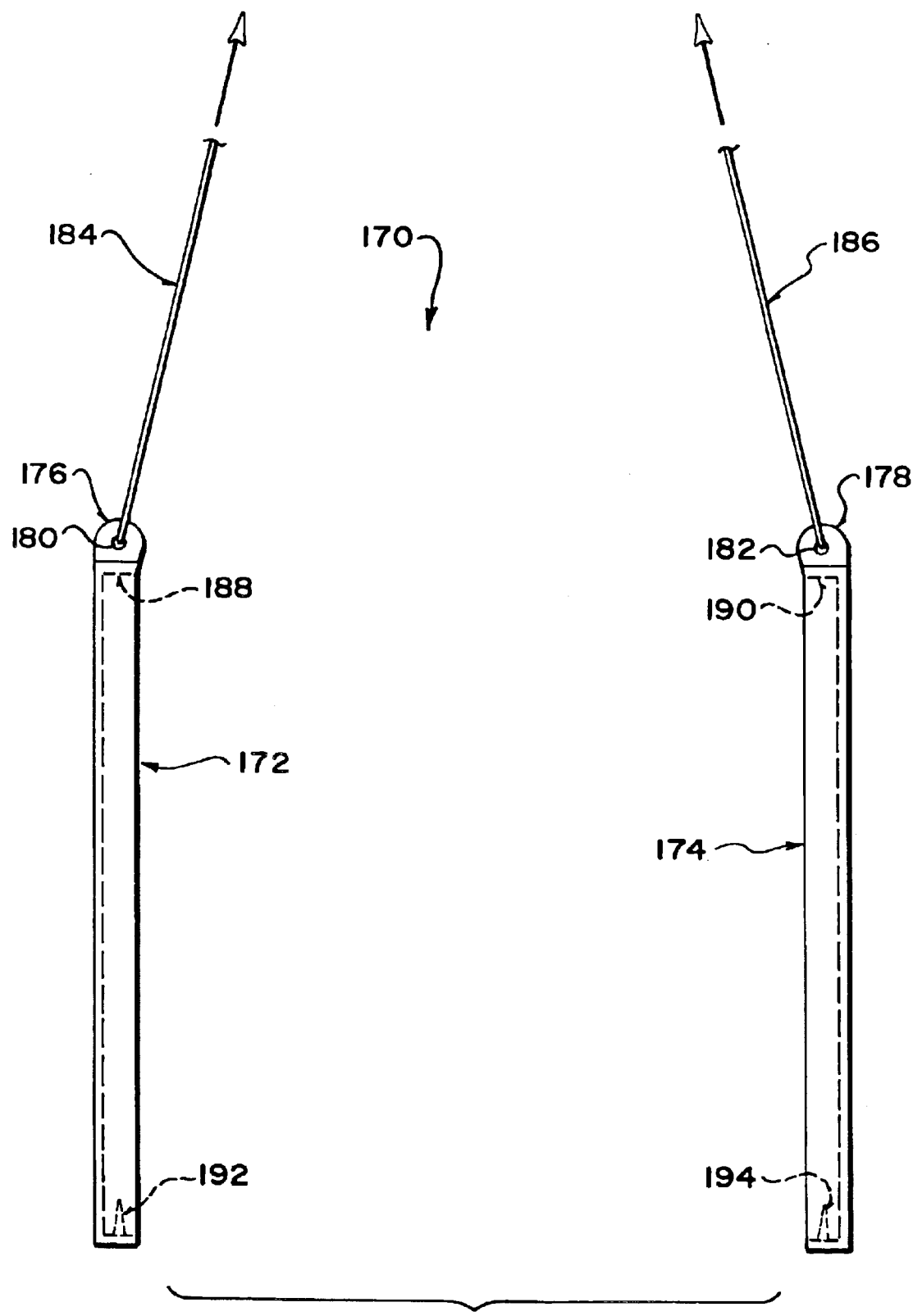
FIG. 11 is a front elevation view of a fifth embodiment of the invention.

In the embodiment of the invention shown in FIG. 11, the frame lifting device is designated by numeral 170. It comprises two vertical channel members 172, 174 which are open on the inwardly-facing side and sized to receive the netting frame 28 between them. The interior surface of the channel and spikes, as discussed below, are shown in phantom outline. As in the previous embodiments, the channel members are sized to slide readily into and out of position between guide rails 22 of lifting basket 10, and to receive the netting frame 28. Lugs 176, 178 are secured to the upper end of vertical members 172, 174 and are provided with holes 180, 182 to which lifting cables 184, 186 can be removably attached. Stop plates 188, 190 are provided across the vertical channels to prevent the wooden frame from floating out of the channels. In operation, in this embodiment the vertical members are positioned on opposing frame members of a new disposable wooden netting frame 28. Spikes 192, 194 hold the vertical members on the wooden frame members. Cables 184, 186 are secured to lugs 176, 178 to lift the new netting frame and netting sack into place between guide rails 22 as shown in FIG. 1. When the netting sack needs to be replaced, cables 184, 186 are secured to flanges 176, 178 to lift the netting frame and netting sack out of the guide rails 22 and onto the disposal truck. The disposable frame 28 is then removed by removing the tension from cables 184, 186 and removing disposable frame 28 from members 172, 174 thereby allowing the disposable frame 28 and netting sack 26 to be discarded.

Figure 12:
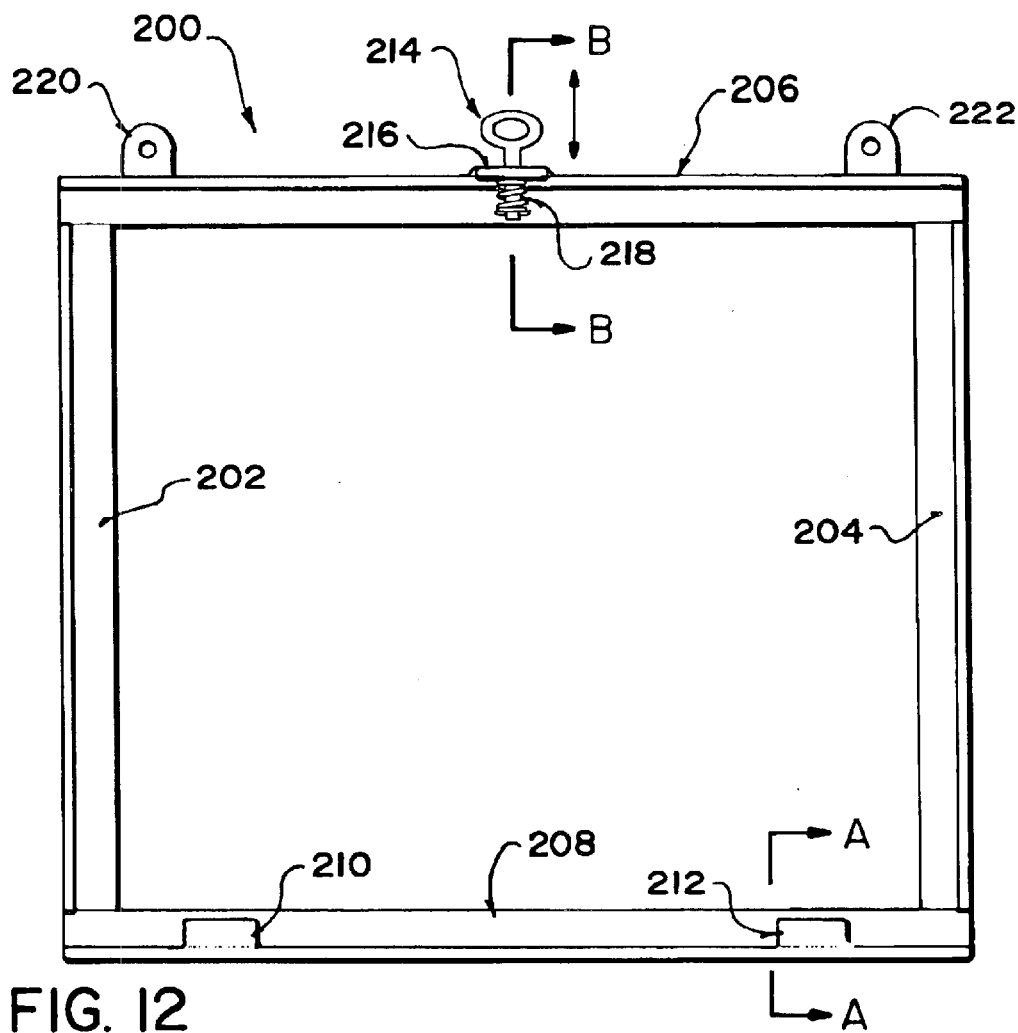
FIG. 12 is a front elevation view of a sixth embodiment of the invention.
Figure 13:
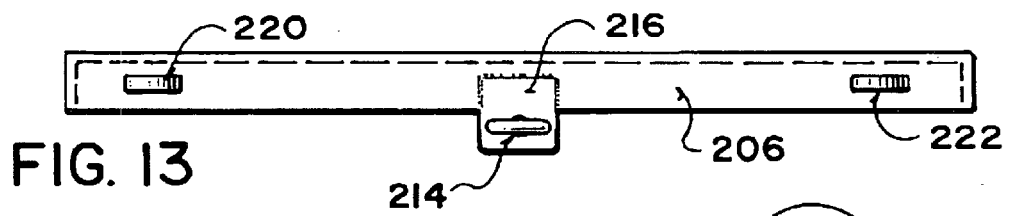
FIG. 13 is a top plan view of the embodiment of the invention shown in FIG. 12.
Figure 14:
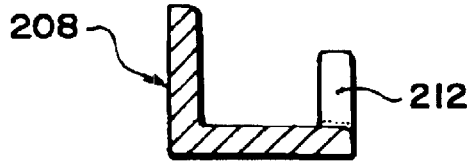
FIG. 14 is a cross-section view taken along lines A—A of FIG. 12.
Figure 15:
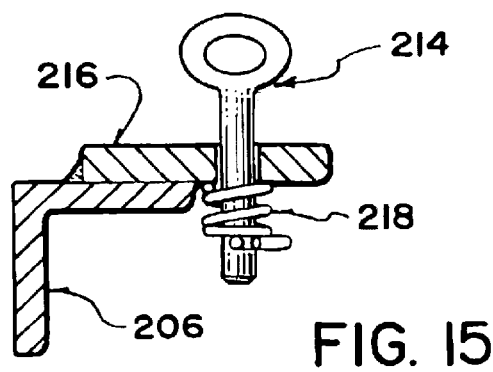
FIG. 15 is a cross-section view taken along lines B—B of FIG. 12.

In the embodiment of the invention shown in FIGS. 12 through 15, the frame lifting device is designated by numeral 200. Vertical members 202, 204 and horizontal member 206, 208 are formed of 90-degree angle iron and are rigidly welded at right angles as shown in FIG. 12 to form a rigid rectangle or square. Retaining plates 210, 212 are welded to horizontal member 208 to retain netting frame 28. The vertical members 202, 204 are sized to slide readily into and out of position between guide rails 22 of lifting basket 10, and device 200 is sized to receive the netting frame 28 from the direction extending into the page in FIG. 12. Moveable pin 214 slides vertically in an aperture in mounting plate 216 and is biassed downwardly by spring 218. By pulling pin 214 to the upper position, the netting frame 28 is permitted to be introduced into or removed from the lifting frame 200. Lugs 220, 222 are secured to horizontal member 206 and are provided with holes to which lifting cables (not shown) can be removably attached. In operation, in this embodiment pin 214 is raised, a new disposable wooden netting frame 28 is positioned over retaining plates 210, 212 within frame lifting device 200 and pin 214 is lowered to retain netting frame 28 within frame lifting device 200. Cables are secured to lugs 220, 222 to lift the new netting frame and netting sack into place between guide rails 22 as shown in FIG. 1. When the netting sack needs to be replaced, cables lift the netting frame and netting sack and lifting frame 200 out of the guide rails 22 and onto the disposal truck. The disposable frame 28 is then removed by raising pin 214 thereby allowing the disposable frame 28 and netting sack 26 to be removed and discarded.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for replaceably securing a netting sack in the diverter frame of a floatables control system, wherein said netting sack comprises a mouth secured to a rigid netting sack frame and said diverter frame comprises receiving frame means for removably receiving said netting sack frame, said system comprising a netting sack lilting frame comprising:

i) two opposed rigid parallel frame members, said frame members being adapted to removably receive between them said rigid netting sack flame, and being movable from a first closed position in which said netting sack is held between said frame members to a second open position wherein said netting sack frame is released from between said frame members, said frame members being sized to be received in said receiving frame means when said frame members am in said closed position; and ii) means fix removably attaching lifting means to said netting sack lifting frame.

2. The system of claim 1 wherein said frame members are adapted to removably receive said netting sack frame by being provided with channels sized to receive said netting sack frame.

3. The system of claim 2 wherein said frame members comprise two opposed elongated channeled members.

4. The system of claim 3 wherein said frame members comprise two opposed C-shaped channeled members.

5. The system of claim 1 wherein said frame members comprise three hingedly connected channeled members.

6. The system of claim 1 wherein said frame members comprise three rigidly connected members, forming two vertical members joined at the lower ends thereof by a horizontal member, each member comprising first and second plates forming a 90 degree angle in cross-section, and further comprising a plurality of hinged means attached to one edge of said members and movable between an open position parallel to the outer vertical surface of said vertical members and a closed position perpendicular to the outer vertical surface of said vertical member.

7. The system of claim 1 wherein said frame members comprise two opposed right-angled frame members, said mine members being adapted to receive said netting sack frame, each frame member having a vertical frame member and a horizontal frame member, said horizontal frame members each having a first end adjacent to and opposed to said first end of the other horizontal frame member, and a second end, the opposed ends of said horizontal frame member being pivotally connected and having first means for selectively attaching lifting means, each horizontal frame member having second means for pivotally attaching lifting means spaced from said first end towards said second end of said horizontal frame member, third means for selectively attaching lifting means, wherein said third means for pivotally attaching lifting means is pivotally connected to said first means for selectively attaching lifting means, and means for selectively and releasably connecting said third means for selectively attaching lifting means to said first means for selectively attaching lifting means, wherein said opposed frame members are pivotable from a first position in which said vertical frame members are parallel, to a second position in which said vertical members are outwardly angled.

8. The system of claim 7 wherein said means for selectively and releasably connecting said third means for selectively attaching lifting means to said first means for selectively attaching lifting means comprises a snap shackle having release means and a cable connected to said release means.

9. The system of claim 7 wherein said fist and second horizontal frame members are pivotally connected to a third horizontal frame member.

10. The system of claim 7 wherein said opposed right angle frame members are adapted to be slidably and removably received in said receiving frame means.

11. The system of claim 7 wherein said opposed right angle frame members comprise rigid channels sized to receive said netting sack frame.

12. The system of claim 1 wherein said opposed right angle frame members are adapted to be received in said receiving frame means when said vertical frame members are in parallel relationship.

13. The system of claim 1 wherein said frame members comprise slots a for inserting means for prying said netting sack frame.

14. The system of claim 1 wherein said frame members comprise stop means extending across said channels to retain said netting sack frame.

* * * * *